United States Patent [19]

Volke et al.

[11] 4,149,857

[45] Apr. 17, 1979

[54] PROCESS FOR THE TWO-STAGE SEPARATION OF AMMONIA

[75] Inventors: Wilfried Volke; Hans Förster; Egon Wolters; Rainer Paulusch, all of Magdeburg; Horst Radon, Grosslehna; Karsten Kalb; Jürgen Franke, both of Weissenfels; Hans-Jurgen Kohl, Halle-Neustadt; Karl-Lothar Rümenapp, Halle, all of German Democratic Rep.

[73] Assignee: VEB Leuna-Werke "Walter Ulbricht", Leuna, German Democratic Rep.

[21] Appl. No.: 883,611

[22] Filed: Mar. 6, 1978

Related U.S. Application Data

[63] Continuation of Ser. No. 723,822, Sep. 16, 1976, abandoned.

[51] Int. Cl.² ............................................. B01D 19/00
[52] U.S. Cl. .......................................... 55/40; 55/42; 55/48; 55/49; 55/56; 55/70
[58] Field of Search ................... 55/49, 51, 70, 73, 40, 55/42, 46–48, 50, 56

[56] References Cited

U.S. PATENT DOCUMENTS

| | | | |
|---|---|---|---|
| 1,724,421 | 8/1929 | Richter | 55/46 |
| 1,992,295 | 2/1935 | DeJahn et al. | 55/51 |
| 2,756,841 | 7/1956 | Asendorf | 55/70 |
| 3,531,917 | 10/1970 | Grunewald | 55/73 |

*Primary Examiner*—Bernard Nozick
*Attorney, Agent, or Firm*—Nolte & Nolte

[57] ABSTRACT

The invention relates to a process for the separation of condensable and absorbable gas components having a critical temperature above 30° C. from a mixture with inert gases, being absorbable at most in a little measure and the proportions of the components of said mixture varying widely, by two-stage absorption and simultaneous compression of the cleaned gas and the separated components to different pressures, in which the varying composition of the gas mixture to be separated is equalized in a first absorption stage so that at least temporarily part of the absorbable components of the mixture is absorbed. The remaining gas mixture is compressed and then introduced into a second absorption stage, wherein are obtained an inert gas mixture largely free from absorbable components and a solution rich in absorbable components, from which the absorbable components of the gas mixture are separated through subsequent multistage thermal desorption, the absorbent being fed back into the process.

10 Claims, 2 Drawing Figures

PROCESS FOR THE TWO-STAGE SEPARATION OF AMMONIA

This is a continuation of application Ser. No. 723,822 filed Sept. 16, 1976, now abandoned.

BACKGROUND OF THE INVENTION

1. Field of the Invention

The invention relates to a process for the separation and recovery of condensable and absorbable gas components from an inert gas to be compressed. The composition of the gas mixture varies in time and the separated gas components must be compressed using a minimum of electric energy.

The condensable and absorbable gas components are gases or vapours having a critical temperature above 30° C., such as ammonia, butane, propane, hydrogen sulphide, sulphur dioxide etc., and for which suitable absorbents are available.

2. Description of the Prior Art

Processes are well known which separate such condensable and absorbable components from a gas mixture using an absorbent in a washing tower. These washing processes are not complicated. What is much more difficult is the separation of the components extracted by absorption from the absorbent. In some cases this is relatively easy by way of thermal desorption, but in the case of systems which cannot be separated easily (such as extraction of $C_2$, $C_3$, $C_4$ hydrocarbons from the absorbing substance) and when the separated components must be highly pure, distillation is necessary and heat is consumed.

Furthermore, the known absorption techniques cannot be used when the gas mixtures to be separated vary heavily in composition and density, which will interfere with the consistent operation of the turbo-compressor arranged downstream.

Washing out most of the gas components to be isolated on the suction side of the compressor, while reducing the quantity of residual gas to be compressed and thus the power consumed in compression, requires large quantities of absorbents to obtain residual gas of the required purity so that heat consumption during the desorption process is increased. The consumption of thermal energy, particularly of valuable energy of high parameters, can be reduced by using very low pressures or a vacuum.

However, large compressors are then required to convey the gas released back into the existing pressure systems. Usually multi-stage or multi-case compressors, designed as turbo-compressors, are necessary. These become more complicated as the desorption pressure decreases.

A disadvantage here is the high power consumption, the diminished reliability of the plant due to the complicated compressors, and the consumption of large quantities of valuable thermal energy.

If the gas mixture to be separated, or the gas-vapour-mixture, have a sufficiently high pressure, absorption is possible with reasonable amounts of absorbent by way of expansion desorption, i.e. without thermal energy. But even then the expansion gas must be recompressed into the existing gas systems. Large, multi-stage, and mostly multi-case compressors having a considerable power consumption are required in most cases, and the reliability of the process suffers. Large quantities of absorbent also have to be pressurized from the expansion pressure to the absorption pressure of the washing process, thus increasing energy requirements. Other techniques are known in which compression refrigeration is used for the partial condensation of condensable gas components. Such processes are comparatively suitable where the component to be separated has some of the properties of a refrigerant. Here too, the drawback is in the large dimensions of the compressor due to the low pressures of the refrigerant and the necessary temperatures in the refrigerant evaporator. Other shortcomings include the additional power consumption and the lower reliability of the plant due to the use of a compressor.

Absorption refrigeration plants are also being used for gas separation. The conventional absorption refrigeration plants do not use compressors, are highly reliable, and their energy consumption is only one tenth of that of compression refrigeration plants. But instead, the cooling water consumption is very high and limits the use of such plants. For plants having a high refrigerating capacity meeting the demand for heat causes problems.

SUMMARY OF THE INVENTION

It has been the object of the present invention to develop a process for separating condensable and absorbable gas components from a mixture to be compressed the composition of which varies in time, which requires a low compressor power and thus has a relatively low power consumption, and which does not use valuable thermal energy of high parameters. Furthermore, the process should be performed without any costly special devices, and a plant using the process should have a high degree of operating safety. The challenge consisted in guaranteeing optimum separation by using a special combination and lay-out of absorption, compressor and desorption stages in connection with the necessary product, absorbent and energy circuits while ensuring minimal energy consumption.

In the invention this problem is solved by a process for the separation of condensable and absorbable gas components having a critical temperature above 30° C. from a mixture with inert gases, being absorbable at most in a little measure and the composition of said mixture varying in time, by two-stage absorption and simultaneous compression of the cleaned gas and the separated components to different pressures, wherein the varying composition of the gas mixture to be separated is equalized in a first absorption stage so that at least temporarily part of the absorbable components of the mixture is absorbed, the remaining gas mixture is compressed and then introduced into a second absorption stage, wherein are obtained an inert gas mixture largely free from absorbable components and a solution rich in absorbable components from which the absorbable components of the gas mixture are separated through subsequent multi-stage thermal desorption, the absorbent being fed back into the process.

The varying composition of the gas mixture is equalized by a large absorbent content in the first absorption stage.

It is preferable to design the first absorption stage as a plate column. Bubble-cap plates or perforated plates with an unusually high accumulation of liquid can be used as exchange plates. The variations in the gas composition and in density are equalized at that stage in the following way: If the content of components to be absorbed reaches very high values, absorption takes place in the quantity of absorbent provided whereas in the case of a minimum content of this component in the gaseous phase absorption is cut back and the absorbed components are released from the solution if necessary. Equalization may also take place in a zone with a high content of absorbent preferably arranged at the point where the gas enters the first absorption stage.

The absorbent containing a certain amount of absorbable components is removed from the first absorption stage and passes into the lower part of the second absorption stage, preferably at a level where the absorbed matter concentration of the injected solution is the same as that of the solution flowing down in the second absorption stage.

It may also be advantageous to saturate the absorbent flowing from the first absorption stage and containing a certain amount of absorbable components with absorbed matter obtained from other stages of the process and to pass it to the desorption stage.

To improve efficiency it is useful to have indirect cooling for the first and second absorption stages to dissipate the heat of absorption, preferably by using an isobarely evaporating coolant. A closed circuit cooling of the coolant is possible, for instance by evaporative cooling with cooling water.

A preferred design for both absorption stages is a plate column where one cooling radiator each is installed for a certain number of exchange plates of a suitable type (bubble-cap plates, perforated plates, valve plates or other).

Vertically installed nests of tubes are especially suitable as cooling radiators. In the internal-tube space the absorbent runs down the tube wall, the gas mixture streams upwards passing the free tube space, whereas an isobarely evaporating coolant in the outer-tube space removes the heat transferred.

If the absorbed substance is suitable as a coolant it may be of advantage to use pure absorbed substance.

In such a case part of the absorbed vapour can be condensed in a suitable condenser using water, air or evaporative cooling, and evaporated as a coolant.

The coolant vapour can be used to saturate the absorbent partially loaded in the first absorption stage so that the latter can pass directly to the desorption stage. Thermal desorption is preferably carried out in a rectifying column, equipped with bottom heating consisting of several separate radiators, a certain number of exchange plates of a suitable type, preferably bubble-cap or valve plates, as well as a dephlegmator for producing the necessary reflux on top. When operating the column a suitable concentration and temperature profile results due to the rectifying effect. The radiators are vertical nests of tubes in the internal tube space of which the absorbent runs down the tube wall, the desorbed absorbed matter streams upwards in the free space, whereas the heating medium flows through the outer tube space.

The desorption stage is heated primarily with heat obtained from other stages of the process.

The process according to the invention is the only procedure for separating condensable and absorbable components the quantity and concentration of which vary in time, from large volume streams of inert gases in the desired way, without using additional devices and of obtaining both the inert gas and the condensable components as a continuous volume stream of increased pressure. The pressure increase in the condensable or absorbable components is effected without a special compressor simply by providing the pressure required for the multi-stage thermal desorption process which is used to expel the absorbed matter from the loaded absorbent. This results in better reliability and flexibility of the plant, fewer start-up problems and a considerable reduction of power consumption in comparison with other processes.

If a highly selective absorbent and appropriate process conditions are chosen any desired degree of accuracy in the separation of inert gas and absorbable components can be obtained. In addition, the multi-stage thermal desorption of the loaded absorbent is carried out in a plate column which has a rectifying effect due to the reflux caused by a dephlegmator the absorbed substance can be obtained with a very high degree of purity and minimum energy consumption.

Limiting the rectifier inlet temperature of the loaded absorbent has a favourable effect on separation and heat consumption. This can be achieved by using the desorbed hot absorbent as a heating medium in counter-flow to the solution down the tubes as a film before the external heat exchange takes place with the loaded absorbent between the two steam heating stages of the desorber. The multi-stage design of the bottom heating in connection with a rectifying effect in the internal tube space of the radiators makes it also possible to use heat carriers of various temperatures for heating. In addition, low-grade heat of low temperature, such as from saturated steam, or heat of low pressure or waste heat may be used for heating purposes if a suitable absorbent is chosen. For instance, low-pressure saturated steam from product waste heat may be generated in thermal processes, the steam being used for heating a multi-stage thermal desorption plant where the heat usually has no other use. In other words the product waste heat would have to be released into the atmosphere without utilizing it in any form.

Including a multi-stage thermal desorption facility in a process, using low heating medium parameters, is therefore a very effective measure in terms of energy consumption, because valuable electric power can be saved and waste heat from processes for which no other use is available can be utilized. It is especially advantageous if the waste heat or the waste steam come from the process in which the absorption-desorption method is used. The waste steam may be produced at little cost from several product streams simultaneously in several pressure stages. The use of a closed refrigerant circuit avoids any contamination of the heat transfer surfaces and minimizes power and cooling water consumption.

DESCRIPTION OF SPECIFIC EMBODIMENTS

EXAMPLE 1

A gas mixture needs to be processed which consists of hydrogen and ammonia. The average concentration is 40% by vol. ammonia, maximum 90% by vol., minimum 28% by vol., the duration of one cycle 5 minutes.

Figure 1:
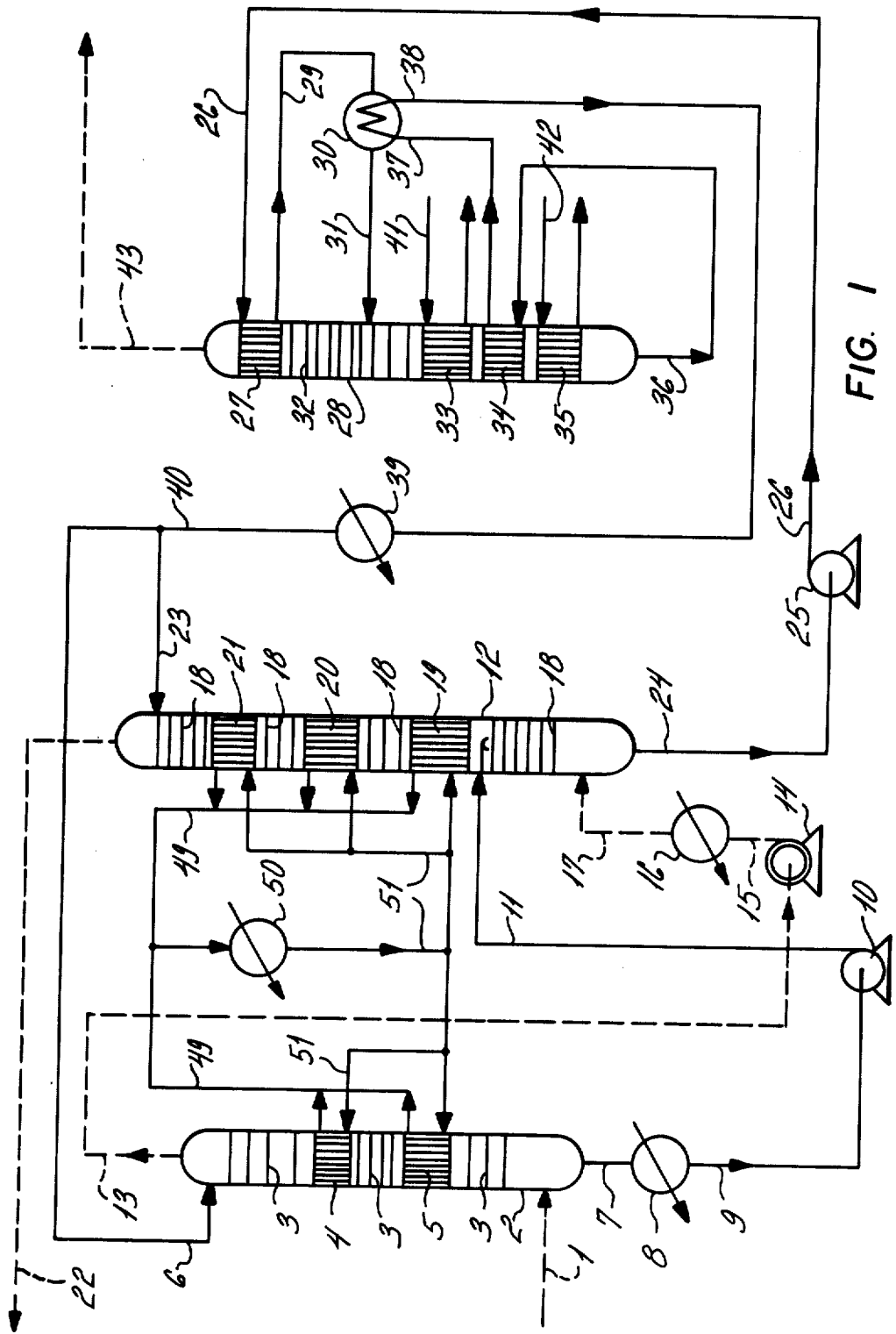

Ammonia water with about 31% by weight ammonia is used as an absorbent. The sequence of operations is shown in FIG. 1 of the drawings. The following design has been chosen for the main apparatus of the absorption and desorption stages (from top to bottom):

The first absorption stage—the absorber 2—consists of
    four bubble-cap plates 3,
    one cooling radiator 4,
    four bubble-cap plates 3, one cooling radiator 5 and
three bubble-cap plates 3.
  Operating pressure is about 9 atm.
  Operating temperature 35° to 65° C.
The second absorption stage—the absorber 12—consists of
five bubble-cap plates 18,
one cooling radiator 21,
three bubble-cap plates 18,
one cooling radiator 20,
three bubble-cap plates 18,
one cooling radiator 19 and
six bubble-cap plates 18.
  Operating pressure is about 16 atm.
  Operating temperature 35° to 65° C.
The desorption stage consists of a desorber 28 which comprises
one dephlegmator 27,
ten bubble-cap plates 32 and
three radiators 33, 34 and 35.
  Operating pressure is about 20 atm.
  Operating temperature 50° to 140° C.

Through line 1 the gas mixture enters absorber 2 near the bottom, passes through the bubble-cap plates 3 and the cooling radiators 4, 5 and leaves the absorber 2 at the top with an average ammonia concentration of about 30% by vol., the amplitude of the variations of concentrations in time being reduced to 5% of the average value due to the extremely high content of the bubble-cap plates 3.

Via line 6 the absorbent is fed to the uppermost bubble-cap plate 3 of absorber 2 at a temperature of 36° C., runs down through the first four bubble-cap plates 3 and in doing so absorbs ammonia from the counterflowing gas mixture. During this process the temperature of the absorbent increases from the heat of absorption. Afterwards it runs through the cooling radiator 4 in which it is cooled to 40° C. As a coolant, ammonia is evaporated in the outer tube space of the cooling radiator 4 at about 14 atm. The processes described are repeated as the absorbent passes downwards through the bubble-cap plates 3 and the cooling radiator 5. At the same time the concentration of the gas mixture equalizes: In the extremely high absorbent content of the bubble-cap plates much or little ammonia is absorbed at a time depending on the ammonia concentration in the gas mixture and in the absorbent, and even desorption takes place at times when the ammonia concentration in the gas mixture is low. As a result of these multiple proceedings, different quantities of absorbent with differing loads reach the bottom of the absorber. Due to storage and mixing effects in the content of the absorber bottom a constant absorbent quantity with 41% by vol. ammonia and a temperature of 60° C. may be obtained via line 7. This is cooled to 35° C. by the cooling water in cooler 8, sucked by a pump 10 through line 9 and passed into absorber 12 of the second absorption stage via line 11. The mixture flows from the top of absorber 2 through line 13 to a turbo-compressor 14 which compresses it to about 16 atm., the operating pressure of absorber 12. It is then passed to a cooler 16 via line 15, where the heat of compression is removed by cooling water, and a temperature of 40° C. is obtained.

Via line 17 the gas mixture is then fed into absorber 12 below the lowest of the bubble-cap plates 18. The gas mixture passes through the bubble-cap plates 18 and the cooling radiators 19 to 21 of absorber 12, leaves the latter at the top via line 22 with a maximum of 10% by vol. ammonia, and is then available for further use.

Via line 23 the absorbent is fed into absorber 12 at the uppermost of the bubble-cap plates 18 at a temperature of 36° C. Absorbent enrichment on the bubble-cap plates 18 and cooling in the cooling radiators 19 to 21 is as described for absorber 2. The partially loaded absorbent stream from absorber 2 enters the absorber at one of the bubble-cap plates 18 below the cooling radiator 19. The two streams unite in the bottom of absorber 12, the ammonia concentration is 48% by weight, the temperature 50° C. The loaded absorbent is passed via line 24 to a pump 25 which conveys it via line 26 into the outer tube space of the dephlegmator 27 of the desorber 28 in which it serves as a coolant for the condensation of the reflux and heats up to about 70° C. From dephlegmator 27 the absorbent passes via line 29 to a heat exchanger 30 in which it is preheated to the inlet temperature of about 95° C. and flows via line 31 to the fifth of the ten bubble-cap plates 32 of desorber 28. From there it passes downwards through the bubble-cap plates 32 and the radiators 33 to 35, its temperature constantly increasing and the ammonia concentration becoming lower, and is then collected in the bottom of desorber 28 at a temperature of 130° C. and with an ammonia concentration of 31% by weight. Via line 36 the absorbent leaves desorber 28, is passed into the outer tube space of radiator 34, transfers part of its thermal energy to the loaded absorbent streaming downwards, and runs via line 37 to the heat exchanger 30 which it enters at a temperature of 115° C., and heats the loaded absorbent to the desorber inlet temperature. In doing so it is cooled to 55° C. and flows via line 38 to a water cooler 39.

The cooled absorbent expands via lines 40 and 23 into the absorber 12 of the second absorption stage or via lines 40 and 6 into the absorber 2 of the first absorption stage. The radiator 33 is heated with saturated steam of 1.5 atm. via line 41, the radiator 35 with saturated steam of 3.5 atm. via line 42.

The ammonia which has been desorbed from the absorbent in desorber 28 leaves the latter in a gaseous state at the top with traces of inert gas and a maximum content of water vapour of 0.2% by volume and is passed for further use through line 43.

The ammonia evaporated as a refrigerant in the cooling radiators 4 and 5 of absorber 2, and 19 to 21 of absorber 12, is passed via line 49 into the evaporative cooler 50 where it is condensed. The heat of condensation of the ammonia is removed at the outer surface of the cooler tubes by cooling water evaporation. By gravity the condensed ammonia runs through lines 51 to the cooling radiators 4, 5 and 19 to 21.

EXAMPLE 2

Figure 2:
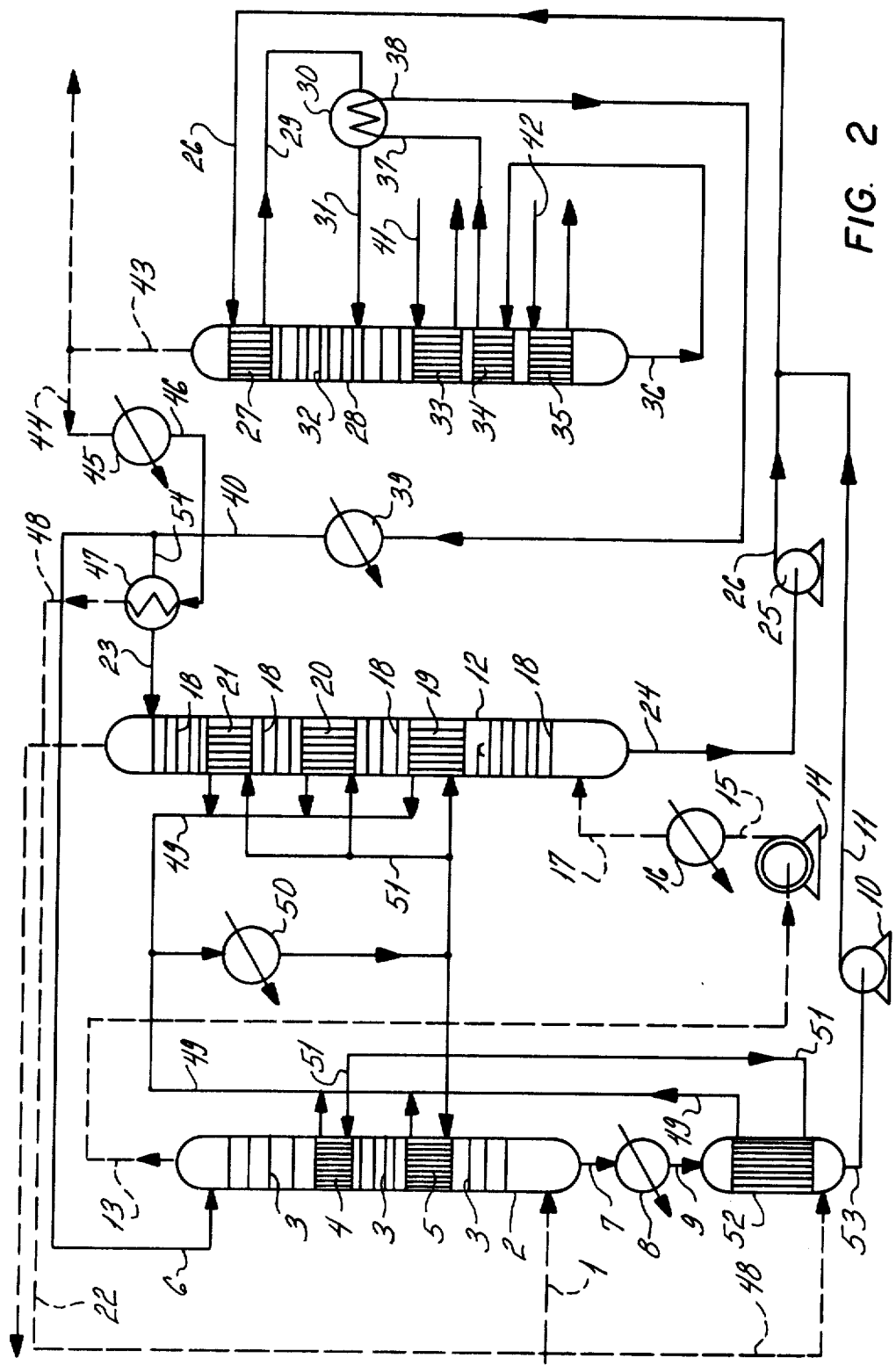

The basic operating sequence described in example 1 is retained but extended by the following as shown in FIG. 2. Facilities are provided for reducing the ammonia concentration in the inert gas which leaves absorber 12 via line 22 to a maximum of 5% by volume.

Part of the desorbed ammonia which leaves desorber 28 via line 43 is passed into the cooler 45 via line 44 where it condenses with the help of cooling water at a pressure of 19.5 atm. and at about 48° C. and expands via line 46 into the outer tube space of a heat exchanger 47 where it evaporates at a pressure of about 7.5 atm. and about 15° C. The evaporated ammonia goes via line 48 to a cooled tube absorber 52 in the internal tube space of which it is absorbed.

The partially loaded ammonia water which is extracted from the bottom of absorber 2 and fed to the tube absorber 52 via line 7, cooler 8 and line 9, is the absorbent.

Then the loaded ammonia water is sucked by pump 10 from the lower part of the tube absorber 52 via line 53 and conveyed to the desorber 28 via lines 11 and 26. The heat of absorption is removed by evaporating liquid ammonia in the outer tube space of the tube absorber. The liquid ammonia flows via line 51 from the evaporative cooler 50 to the tube absorber 52, the evaporated ammonia flows via line 49 back to the evaporative cooler 50.

The absorbent quantity necessary for absorber 12 is passed to the heat exchanger 47 from the cooler 39 and via lines 40 and 54, cooled from 40° C. to 20° C. by the ammonia evaporating in the outer tube space, and then passed via line 23 to the uppermost of the bubble-cap plates 18 of absorber 12.

What is claimed is:

1. In a method of separating ammonia from a mixture of ammonia and hydrogen, said mixture varying widely in the proportions of the component gases contained within it, which method comprises delivering said mixture to a first absorption stage and absorbing ammonia therein, compressing the mixture exiting said first absorption stage in a turbo-compressor and delivering the compressed mixture to a second absorption stage in which absorption of ammonia is completed, delivering the absorbent from said second absorption stage to desorption means to separate the absorbent and the absorbed ammonia and returning the absorbent to said absorption stages for reuse, the improvement comprising maintaining a large absorbent content in said first stage to reduce substantially the variations in the proportions of the components of said mixture exiting said first absorption stage.

2. The method according to claim 1 in which the first and second absorption stages are indirectly cooled.

3. The method according to claim 1 in which the desorption stage consists of several stages with rectifying means.

4. The method according to claim 1 in which heating of the desorption stage is effected through heat obtained from other stages of the process.

5. the method according to claim 1 in which the first and second absorption stages are indirectly cooled by a refrigerant, evaporating at substantially constant pressure, involving closed circuit cooling of the refrigerant by evaporative cooling with cooling water.

6. The method according to claim 1 in which the first and second absorption stages are indirectly cooled by an isobarely evaporating refrigerant.

7. The method according to claim 6 in which pure absorbed matter is used as a refrigerant.

8. The method according to claim 1 in which the large absorbent content is maintained in a region of said first absorption stage located at a region at which said mixture is admitted to said stage.

9. The method according to claim 1 in which absorbent and absorbed gases are obtained from said first absorption stage and are delivered to a lower part of the second absorption stage than a part at which fresh absorbent is admitted to said second absorption stage.

10. The method according to claim 9 in which said absorbent and absorbed gases obtained from said first absorption stage are delivered to the second absorption stage at a region where the absorbed matter concentration of the fresh absorbent passing through the second absorption stage coincides with that of the absorbent from said first absorption stage.

* * * * *